Figure 1:
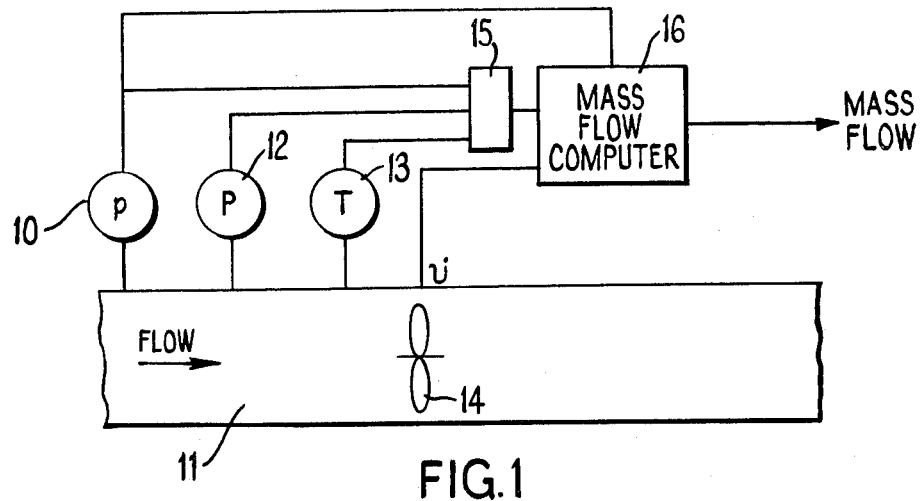

United States Patent [19]

Zanker et al.

[11] 4,419,898

[45] Dec. 13, 1983

[54] METHOD AND APPARATUS FOR DETERMINING THE MASS FLOW OF A FLUID

[75] Inventors: Klaus J. Zanker, Four Marks, near Alton; Gerald Anderson, New Arlesford, both of England

[73] Assignee: Sarasota Automation Limited, Winchester, England

[21] Appl. No.: 311,523

[22] Filed: Oct. 15, 1981

[30] Foreign Application Priority Data

Oct. 17, 1980 [GB] United Kingdom ............... 8033540

[51] Int. Cl.³ ............................................... G01F 1/86
[52] U.S. Cl. ...................................... 73/861.02; 73/3; 364/510
[58] Field of Search ............... 73/3, 861.03, 861.02; 364/510

[56] References Cited

U.S. PATENT DOCUMENTS

| | | | |
|---|---|---|---|
| 3,176,514 | 4/1965 | Foster | 73/861.03 |
| 3,701,280 | 10/1972 | Stroman | 73/861.03 |
| 3,831,011 | 8/1974 | Hulme | 73/861.03 |
| 4,048,854 | 9/1977 | Herzl | 73/861.02 |

FOREIGN PATENT DOCUMENTS 2036972 2/1983 United Kingdom ............ 73/861.03

OTHER PUBLICATIONS

MP800 Sonic Prover Calculator, pamphlet by J. Agar Inst. Ltd. 1/77.

*Primary Examiner*—Herbert Goldstein

[57] ABSTRACT

A method of determining the mass flow of a fluid comprising measuring a plurality of parameters comprising the pressure P, the temperature T and the density $\rho$ of the fluid, determining the specific gravity G of the fluid from the said parameters, and using the measured density $\rho$ together with a further parameter which varies with the volumetric flow to evaluate the mass flow of the fluid only if the so-determined value of G is within a given range of values.

5 Claims, 5 Drawing Figures

METHOD AND APPARATUS FOR DETERMINING THE MASS FLOW OF A FLUID

This invention concerns a method and apparatus for determining the mass flow of a fluid.

The determination of the value of the mass flow of a fluid involves the measurement of the density $\rho$ of the fluid and of a parameter which varies with the volumetric flow of the fluid. Clearly, if these parameters are wrongly measured, the determination of the mass flow will be inaccurate.

Various known methods exist for attempting to ensure that the said parameters are correctly measured. For example, each parameter can be measured twice, at the same or substantially the same position, but if the two measurements do not agree it is not clear which of the two measurements is wrong. Another known methods is for each measurement to be determined three times at the same or substantially the same position and for a measurement to be accepted only when at least two of the three readings agree. In each of these known methods, however, it is difficult or impossible to arrange that the parameters really are measured at the same or substantially the same point.

Yet another known method is to determine the rate of change of the measurement of each parameter with time and to assume that any large rate of change is a measurement error rather than a physical phenomenon. Such an assumption, however, is not necessarily correct. For example, the pressure, and hence the density, of the fluid can change rapidly from a quite normal occurrence such as a valve opening or closing to change the flow rate or delivery point or the shutting down of a compressor or other pressure source.

According, therefore, to the present invention, there is provided a method of determining the mass flow of a fluid comprising measuring a plurality of parameters comprising the pressure P, the temperature T and the density $\rho$ of the fluid, determining the specific gravity G of the fluid from the said parameters, and using the measured density $\rho$ together with a further parameter which varies with the volumetric flow to evaluate the mass flow of the fluid only if the so-determined value of G has a given value or is within a given range of values.

For example, the value of the specific gravity (relative density) G of a gas can be calculated from the expression $$G = (\rho z T)/P \quad (1)$$

where
 $\rho$ = the density of the gas
 z = the compressibility of the gas (the compressibility being a function of P and T or of $\rho$ and T)
 T = the absolute temperature of the gas
 P = the absolute pressure of the gas.

Thus if a known gas of known specific gravity G is used, the determination of the value of G from the values of the parameters P, T, $\rho$ will enable one to check the accuracy of the determined value of $\rho$. If the mass flow of the gas is determined only if the value of G corresponds substantially to the expected value thereof, then the mass flow of the gas can be determined in the knowledge that the value of $\rho$ has been carefully checked and is very unlikely to be inaccurate.

In one form of the invention, at each of a plurality of different regions in the fluid, the value of the said plurality of parameters may be determined, the value of the mass flow being determined only if the values of G at the said regions are the same or are within a given range. If desired, the said different regions may be respectively in intercommunicating conduits all of which receive the same fluid.

The method of the present invention may be used in conjunction with the known methods referred to above. Thus the said plurality of parameters may be measured twice to obtain the pressures $P_1$, $P_2$, the temperatures $T_1$, $T_2$ and the densities $\rho_1$, $\rho_2$, in which case the specific gravities $G_1$, $G_2$ calculated from these plurality of parameters should be equal to each other, since the specific gravity of the gas is solely determined by its composition.

Similarly, if the said plurality of parameters are measured three times, the arrangement may be that the value of a parameter is accepted only if the same value is obtained on at least two of the three occasions and if the specific gravities $G_1$, $G_2$, $G_3$ are the same or substantially the same.

Alternatively, the values of the said plurality of parameters may be determined at two different times, the specific gravity of the fluid being determined from the said plurality of parameters at each of said times, and the value of the mass flow being determined only if the rate of change of G with time has a given value or its within a given range of values. Such a method is superior to the known rate of change method because the latter method is frequently affected by pressure transients and temperature transients, whereas rapid changes in the specific gravity of the fluid are rare and will occur only in the case of a controlled change of product. That is to say, such a change will be both infrequent and expected.

The invention also comprises apparatus for determining the mass flow of a fluid comprising means for measuring a plurality of parameters comprising the pressure P, the temperature T, and the density $\rho$ of the fluid, means for determining the specific gravity of the fluid from the said parameters, means for producing a further parameter which varies with the volumetric flow of the fluid, and means to evaluate the mass flow of the fluid from the values of $\rho$ and of the said further parameter, the last-mentioned means being rendered operative only if the so-determined value of G has a given value or is within a given range of values.

Figure 3:
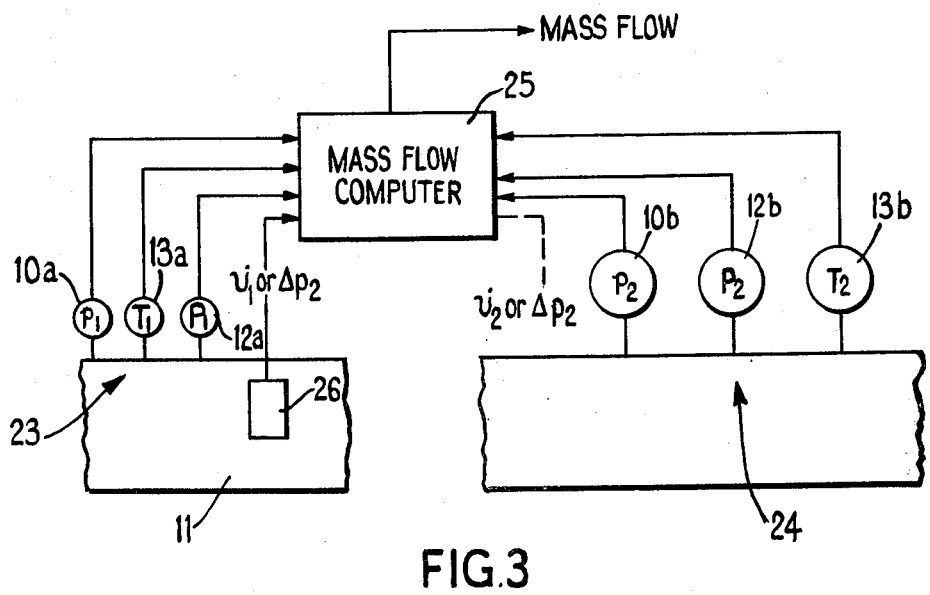
Figure 2:
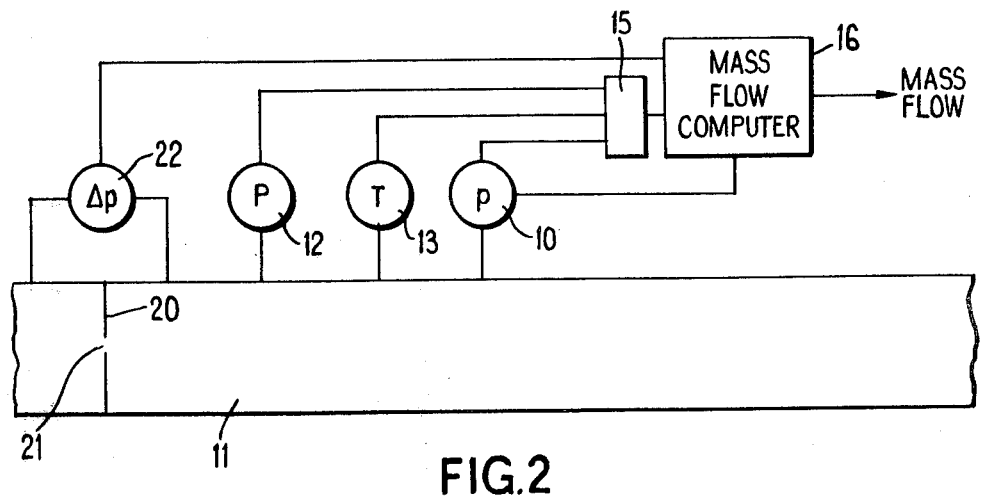
Figure 4:
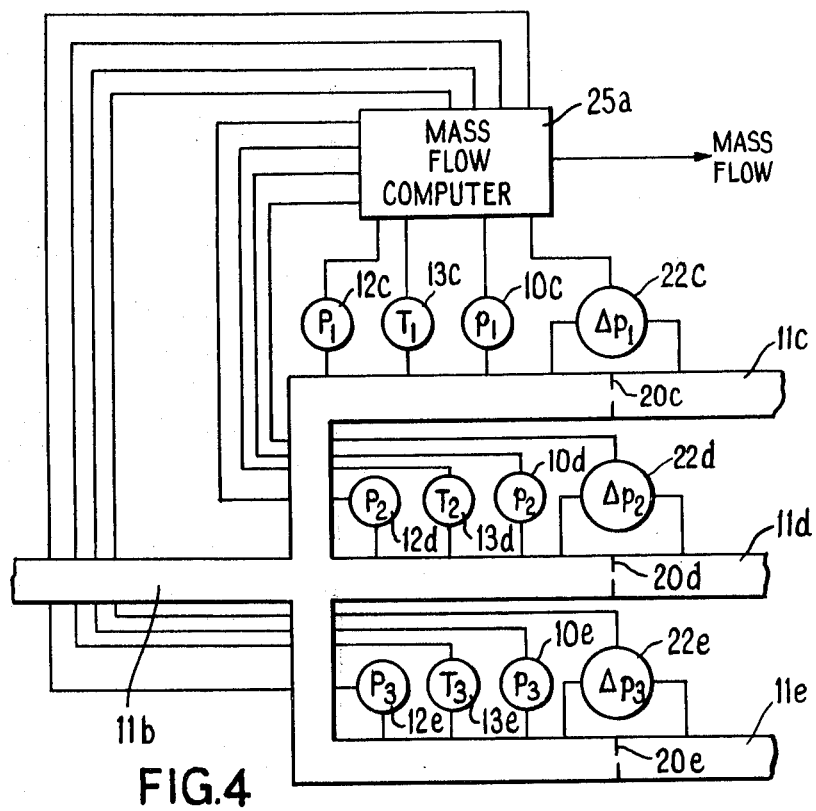
Figure 5:
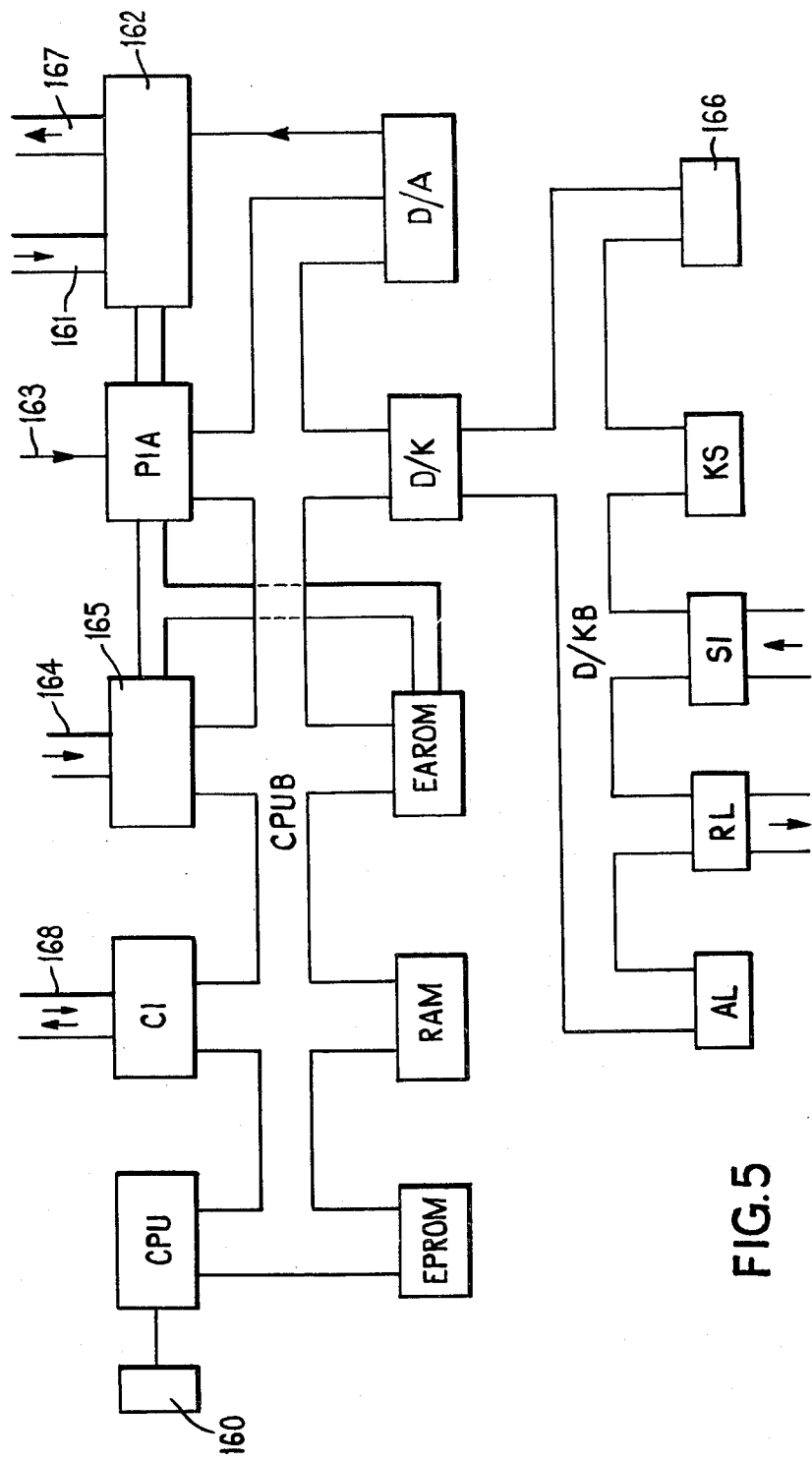

The invention is illustrated, merely by way of example, in the accompanying drawings, in which:

FIG. 1 is a diagram illustrating a first embodiment of an apparatus according to the present invention for determining the mass flow of a fluid, the said first embodiment employing a turbine volumetric flow device, FIG. 2 is a diagram similar to FIG. 1 but illustrating a second embodiment of the said apparatus employing an orifice plate, FIG. 3 is a diagram similar to FIGS. 1 and 2 but illustrating a third embodiment of the said apparatus in which the pressure P, temperature T and density $\rho$ of a fluid are measured at a plurality of different points, FIG. 4 is a diagram similar to FIGS. 1 and 2 but illustrating a fourth embodiment of said apparatus in which there are a plurality of intercommunicating conduits all of which receive the same fluid, and FIG. 5 is a highly simplified block diagram showing, in very general manner, one of the many possible arrangements which could be used for effecting computation in the embodiments illustrated in FIGS. 1 to 4.

In FIG. 1 there is shown a first embodiment of an apparatus according to the present invention which comprises a density meter 10 for measurind the density $\rho$ of a gas or liquid flowing in a conduit 11, a pressure transducer 12 for measuring the absolute pressure P of the fluid in the conduit 11, a temperature transducer 13 for measuring the absolute temperature of the said fluid, and a turbine volumetric flow device 14 for measuring the volumetric $\nu$ of the said fluid. The temperature transducer 13 may be a platinum resistance thermometer or thermocouple, while the volumetric flow device 14 may if desired be a vortex device rather than a turbine device.

A specific gravity device 15, which may be part of a mass flow computer 16, is arranged to receive signals from the density meter 10, pressure transducer 12, and the temperature transducer 13. The specific gravity device 15 is arranged to evaluate the specific gravity G of the fluid in the conduit 11 from the equation $$G = kzT\rho/P \qquad (2)$$

where k = a constant, and z, T, $\rho$ and P have the meanings discussed above.

The specific gravity device 15 is arranged to produce an output signal which is representative of the specific gravity G of the fluid in the conduit 11 and which is transmitted to the mass flow computer 16. The value of G as determined by the specific gravity device 15 is compared in the mass flow computer 16 with a given value of G which is either held in the computer memory or is obtained from some other point as discussed below.

The mass flow computer 16 receives signals from the density meter 10 and from the volumetric flow device 14. If the value of G as determined by the specific gravity device 15 and the said given value of G are equal to each other within the allowable error band $\epsilon$, a gate circuit (not shown) which forms part of the mass flow computer 16, is actuated to enable the mass flow computer 16 to determine the mass flow of the fluid in the conduit 11 in accordance with the formula:

$$\text{Mass flow} = \rho \times \nu \qquad (3)$$

The computer 16 may take any of a wide variety of different forms depending upon the specific requirements in any individual case e.g. whether acceptance of commands from and/or transmission of transducer input signals, or of calculation results to a remote point is required, what peripherals are required to be associated with the computer, and so on. The essential functions which the computer has to perform to carry out the present invention will, it is thought, be clear from the description already given with reference to FIG. 1, and, given knowledge of these functions, persons skilled in the art should have no difficulty in providing a computer to perform these functions and such other functions, extraneous to the invention itself, as may be required in any individual case. Indeed, existing commercially available computers, such as the Redland Automation computers known as the FCD 800 Flow Computer and as the FCD 900 Flow Computer, lend themselves readily to modification so as to be suitable for use in carrying out this invention.

Computation may be effected directly on input analog signals derived from the parameter measuring transducers or such signals may be converted into digital signals for computation (this will, in practice, usually be preferable) or hybrid analog/digital computation may be adopted.

FIG. 5 shows, so far as is necessary for an understanding of its use for the purposes of this invention, a form of computer which effects digital computation and is, in fact, a modified form of the FCD 900 Flow Computer above mentioned. It performs the functions required in carrying out this invention together with a number of other functions which are extraneous to the invention and will therefore be referred to only briefly.

Referring to FIG. 5, input signals from the pressure and temperature transducers 12, 13, from the density meter 10 and from the turbine volumetric flow device 14 are passed over a bus CPUB to a central signal processing unit CPU of a Redland Automation FCD 900 computer the restart unit of which is represented by a block 160. In the particular case illustrated by FIG. 5, pressure and temperature transducer signals are fed in at 161 to apparatus in a unit 162 which houses an 8-way differential input multiplexer, and comparator circuitry which in conjunction with a unit D/A acts as an analogue to digital signal converter. The unit 162 is in communication with a unit PIA to which output from the turbine volumetric flow device 14 is fed in at 163. Two outputs from density measuring transducers are fed in at 164 to timers in a block 165. When all the inputs have been assessed they are stored in a Random Access Memory RAM connected to the bus CPUB and are checked to ensure that they lie within secified ranges before commencement of the actual computation phase. For computation both transducer derived signals and information previously entered, by an engineer, in an electrically erasable long term read only memory store EAROM, are required. The programme operating sequence is determined by data contained in an electrical programme read only memory store EPROM and, during the computation phase, use is made of calculating routines for which the apparatus is programmed. Results from the computation phase are also placed in the memory RAM to allow of immediate recall by an operator for display in a display unit 166 or to allow of further processing before transmission elsewhere. For such selection of operations, the operator uses a keyboard and switch unit KS of a display/keyboard controller interface D/K. The latter is in communication with the bus CPUB and also through another bus D/KB, with the display unit 166 and such other units as may be required—for example an alarm unit AL with a buzzer and indicator lamps for giving an alarm if the signals from any of the transducers go outside predetermined prescribed limits; a relay and latching unit RL for outward transmission of signal information to a remote point; and a static input unit SL for reception of inward static signals. The keyboard and switch unit KS may also be used for purposes extraneous to the invention. The display/keyboard controller interface D/K also includes provision for enabling two standard current indications of any seected transducer input or of a calculated result, to be obtined at 167 via a digital-to-analog converter D/A and suitable circuitry included in the unit 162, while the bus CPUB also provides communication with a communication interface Cl to which is connected a standard "data highway" 168 leading to remote equipment such as a printer or a data terminal for remote operation.

The units PIA, 162, 165, Cl, D/K and D/A are peripherals and are the important units for "talking" to the outside world. The unit PIA has a number of control lines for various purposes—mainly for "internal housekeeping" in the computer (this is the reason for its being in communication with the timers at 165 and the memory EAROM)—but some are used to drive a multiplexer for examining various input signals such as pressure signals, temperature signals, differential pressure signals and optionally one or more gravity signals. A signal representative of specific gravity could be fed in to the unit 162 as a separate signal or, alternatively, it could be computer in this unit. The timers at 165 are used for measuring the frequency of the signal from the density meter, and one of them is used for producing an internal real time clocking signal. Of the memories, EPROM is, as already stated, the programming memory and RAM is the working memory while EAROM is an electrically erasable non-volatile store (when the power is switched off) employed for constant storage, e.g. of values for comparison.

In FIGS. 2-4 there are shown apparatus each of which is generally similar to that of FIG. 1 and which, for this reason, will not be described in detail, like reference numerals indicating like parts.

In the FIG. 2 construction, however, the turbine volumetric flow device 14 of FIG. 1 is replaced by a volumetric flow device comprising an orifice plate 20 which is disposed in and across the conduit 11 and which has an orifice 21 therein to create a pressure drop across the orifice, the value of such pressure drop varying with the volumetric flow. The static pressures on opposite sides of the orifice plate 20 are applied to a differential pressure cell 22. The latter produces a differential pressure signal $\Delta p$ which is thus representative of the said volumetric flow and which is transmitted to the mass flow computer 16. The mass flow computer 16 in this case (which may be of the kind shown in FIG. 5) computes the mass flow from the equation $$\text{Mass flow} = C \sqrt{\rho \times \Delta_p}$$

where C is substantially a constant. The P and T measurements may, if desired, be used to modify the value of C according to published standards.

The specific gravity devices 15 of FIGS. 1 and 2 are arranged to provide an indication (not shown) of the specific gravity. For example, this indication could be provided by a readout of the value of G on the display of the mass flow computer 16 when the specific gravity devices 15 are incorporated in the mass flow computers 16. The specific gravity devices 15 may be tested, where practicable, by passing air through the conduit 11, in which case they should show a specific gravity G=1.00. Similarly, any known pure fluid (e.g. ethylene) may be passed through the conduit 11 in order to see whether the specific gravity device 15 is accurate.

In the FIG. 3 construction, the values of the pressure, temperature and density of the fluid in the conduit 11 are determined at spaced apart regions 23, 24. At the region 23 there are provided a density meter 10a, pressure transducer 12a, and temperature transducer 13a which are arranged to transmits signals representative of the density $\rho_1$, the pressure $P_1$, and the temperature $T_1$ of the region 23 to a mass flow computer 25 which incorporates two specific gravity devices (not shown) each corresponding to the device 15. At the region 23 there is also provided a volumetric flow device 26 for transmitting a signal $v$, or $\Delta p_1$ to the mass flow computer 25, the device 26 corresponding either to the turbine volumetric flow device 14 of FIG. 1 or to the orifice plate 20 of FIG. 2.

At the region 24 there is similarly provided a density meter 10b, pressure transducer 12b and temperature transducer 13b. The mass flow computer 25 calculates the specific gravities of the fluids in the regions 23, 24 and if these specific gravities are the same or are within a given range, the mass flow computer 25 then computes the mass flow either from the equation (3) or from the equation (4) depending upon the nature of the device 26.

As will be appreciated, the density temperature and pressure may be measured at any number of regions and not just two regions as shown in FIG. 3.

As described above, it has been assumed that the values of $P_1$, $T_1$, $\rho_1$ are substantially the same as those of $P_2$, $T_2$, $\rho_2$, but this is not necessarily so. Thus the region 24 may communicate with the region 23 via a pressure regulator (not shown), the pressure regulator being arranged to bring the fluid to conditions near to specific gravity reference conditions or to any other conditions. Thus the parts 10b, 12b, 13b could be connected to an independent specific gravity device forming part of or connected to the mass flow computer 25.

The apparatus shown in FIG. 3 may be used in what is known as "custody transfer", where, for example, a seller of a fluid, e.g. natural gas, transmits the fluid to a buyer thereof through a common conduit, both the seller and the buyer measuring the mass flow of the fluid through this conduit. Plainly it is essential that the value of the mass flow, as measured both by the seller and the buyer, is the same. The apparatus of FIG. 3 ensures that in this case the mass flow is not computed or an alarm is signalled (by means not shown) if the specific gravities in the regions 23, 24 differ.

In the case of such a "custody transfer" application it may be desirable also to provide a volumetric flow device (not shown) at the region 24 to determine the value of $v_2$ or $\Delta p_2$. In this case, separate mass flow computers could be used for each of the mass flow and specific gravity calculations, and the two values of the specific gravity could be compared either by transmitting data from the one mass flow computer to the other, or by a mutual exchange of this data.

In the apparatus shown in FIG. 4 a main conduit 11b communicates with branch conduits 11c, 11d, 11e. The branch conduit 11c has a density meter 10c, pressure transducer 12c, temperature transducer 13c, orifice plate 20c and differential pressure cell 22c all of which are arranged to send signals to a mass flow computer 25a corresponding to the mass flow computer 25 of FIG. 3. Similarly, the branch conduit 11d has parts 10d, 12d, 13d, 20d and 22d, while the branch conduit 11e has parts 10e, 12e, 13e, 20e and 22e, all of which send signals to the mass flow computer 25a. The latter is arranged to produce a mass flow signal only if the specific gravities in the branch conduits 11c, 11d, 11e, as determined from evaluating the parameters $P_1$, $T_1$, $\rho_1$; $P_2$, $T_2$, $\rho_2$; and $P_3$, $T_3$, $\rho_3$ are the same.

As specifically described above, the FIG. 4 apparatus is provided with only one mass flow computer. However, if desired, each of the branch conduits 11c, 11d, 11e may have a respective mass flow computer, and the various mass flow computers may be in communication with each other.

The apparatus of FIG. 4 provides a substantial saving in equipment and therefore an improvement in reliability over the prior art. In the conventional known methods, at least two transducers would have to be used in each of the branch conduits 11c, 11d, 11e for determining each of the values of P, T and $\rho$, and these values would have to be compared, any substantial difference in the readings resulting in an error signal, although one could not be sure which reading was correct. However, in the case of the FIG. 4 apparatus, the arrangement could be that if the specific gravity readings produced in two of the branch conduits 11c, 11d, 11e agreed while that in the other branch conduit differed, the said other branch conduit could be assumed to be faulty and could be shut off. Thus the FIG. 4 apparatus uses only half of the transducers previously required.

We claim:

1. A method of determining the mass flow of a fluid comprising measuring, at each of a plurality of different regions in the fluid, a plurality of parameters comprising the pressure P, the temperature T and the density $\rho$ of the fluid, determining the specific gravity G of the fluid from said parameters, and using the measured density together with a further parameter which varies with the volumetric flow to evaluate the mass flow of the fluid only if the so-determined values of G at said regions are within a given range of values.

2. A method as claimed in claim 1 in which the different regions are respectively in intercommunicating conduits all of which receive the same fluid.

3. A method of determining the mass flow of a fluid comprising measuring, at two different times, a plurality of parameters comprising the pressure P, the temperature T and the density $\rho$ of the fluid, determining the specific gravity G of the fluid from said plurality of parameters at each of said times, and using the measured density together with a further parameter which varies with the volumetric flow to evaluate the mass flow of the fluid only if the rate of change of G with time is within a given range of values.

4. Apparatus for determining the mass flow of a fluid comprising means for measuring, at each of a plurality of different regions in the fluid, a plurality of parameters comprising the pressure P, the temperature T, and the density $\rho$ of the fluid; means for determining the specific gravity of the fluid from said parameters; means for producing a further parameter which varies with the volumetric flow of said fluid; and means to evaluate the mass flow of the fluid from the values of $\rho$ and of said further parameter, the last-mentioned means being rendered operative only if the so-determined values of G at said regions are within a given range of values.

5. Apparatus for determining the mass flow of a fluid comprising means for measuring, at two different times, a plurality of parameters comprising the pressure P, the temperature T, and the density $\rho$ of the fluid; means for determining the specific gravity of the fluid from said parameters at each of said times; means for producing a further parameter which varies with the volumetric flow of said fluid; and means to evaluate the mass flow of the fluid from the values of $\rho$ and of said further parameter, the last-mentioned means being rendered operative only if the rate of change of G with time is within a given range of values.

* * * * *